(12) United States Patent
Want et al.

(10) Patent No.: US 8,254,995 B2
(45) Date of Patent: *Aug. 28, 2012

(54) METHOD AND DEVICE FOR COMMUNICATING DATA

(75) Inventors: Roy Want, Los Altos, CA (US); James Kardach, Saratoga, CA (US); Graham D. Kirby, San Jose, CA (US); Trevor A. Pering, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/941,814

(22) Filed: Nov. 8, 2010

(65) Prior Publication Data

US 2011/0059772 A1    Mar. 10, 2011

Related U.S. Application Data

(63) Continuation of application No. 10/025,088, filed on Dec. 18, 2001, now Pat. No. 7,831,278.

(51) Int. Cl.
*H04W 24/00* (2009.01)
(52) U.S. Cl. .................. 455/557; 455/558; 455/407
(58) Field of Classification Search .............. 455/557 B, 455/558, 407, 557
See application file for complete search history.

(56) References Cited

U.S. PATENT DOCUMENTS

| | | | |
|---|---|---|---|
| 4,775,928 A | 10/1988 | Kendall et al. | |
| 5,497,339 A | 3/1996 | Bernard | |
| 5,566,069 A | 10/1996 | Clark et al. | |
| 5,802,468 A | 9/1998 | Gallant et al. | |
| 5,818,425 A | 10/1998 | Want et al. | |
| 5,845,282 A | 12/1998 | Alley et al. | |
| 5,874,960 A | 2/1999 | Mairs et al. | |
| 5,910,802 A | 6/1999 | Shields et al. | |
| 5,937,421 A | 8/1999 | Petrov et al. | |
| 5,949,351 A | 9/1999 | Hahm | |
| 5,952,638 A | 9/1999 | Demers et al. | |
| 5,982,520 A | 11/1999 | Weiser et al. | |
| 6,078,251 A | 6/2000 | Landt et al. | |
| 6,104,392 A | 8/2000 | Shaw et al. | |
| 6,128,661 A | 10/2000 | Flanagin et al. | |
| 6,195,589 B1 | 2/2001 | Ketcham | |
| 6,212,650 B1 | 4/2001 | Guccione | |
| 6,216,014 B1 * | 4/2001 | Proust et al. ................. 455/558 |
| 6,233,611 B1 | 5/2001 | Ludtke et al. | |
| 6,271,839 B1 | 8/2001 | Mairs et al. | |
| 6,292,181 B1 | 9/2001 | Banerjee et al. | |
| 6,292,186 B1 | 9/2001 | Lehman et al. | |

(Continued)

*Primary Examiner* — Kamran Afshar
*Assistant Examiner* — Sayed T Zewari
(74) *Attorney, Agent, or Firm* — Blakely, Sokoloff, Taylor & Zafman LLP

(57) ABSTRACT

A wireless device is disclosed. The wireless device includes a wireless communication module, a data storage module, and a controller for controlling the storage and/or retrieval of data from the data storage module. The wireless communication module communicates with each of a plurality of remote devices and the data storage module defines a first storage area and a second storage area. The controller controls the communication of data between the first storage area and the remote device, and the second storage area and the remote device dependent upon access rights associated with the remote device. The first storage area typically defines a public storage area with which data is exchanged in a relatively free manner, and the second storage area typically defines a private storage area with which data is exchanged in a relatively restricted manner.

16 Claims, 4 Drawing Sheets

U.S. PATENT DOCUMENTS

| | | |
|---|---|---|
| 6,334,575 B1 | 1/2002 | Su-Hui |
| 6,401,059 B1 | 6/2002 | Shen et al. |
| 6,409,086 B1 | 6/2002 | Pellaumail et al. |
| 6,411,275 B1 | 6/2002 | Hedberg |
| 6,418,324 B1 | 7/2002 | Doviak et al. |
| 6,421,232 B2 | 7/2002 | Sallam |
| 6,433,685 B1 | 8/2002 | Struble et al. |
| 6,456,938 B1 | 9/2002 | Barnard |
| 6,456,958 B1 | 9/2002 | Xydis |
| 6,462,810 B1 | 10/2002 | Muraoka et al. |
| 6,463,300 B1 | 10/2002 | Oshima |
| 6,507,762 B1 | 1/2003 | Amro et al. |
| 6,614,350 B1 | 9/2003 | Lunsford et al. |
| 6,629,197 B1 | 9/2003 | Bhogal et al. |
| 6,654,032 B1 | 11/2003 | Zhu et al. |
| 6,731,908 B2 | 5/2004 | Berliner et al. |
| 6,744,752 B1 | 6/2004 | Fifield |
| 6,784,855 B2 | 8/2004 | Matthews et al. |
| 6,788,934 B2 | 9/2004 | Keenan et al. |
| 6,813,674 B1 | 11/2004 | Velasco et al. |
| 6,826,387 B1 | 11/2004 | Kammer |
| 6,859,882 B2 | 2/2005 | Fung |
| 6,901,251 B1 * | 5/2005 | Kiessling et al. ............ 455/410 |
| 2002/0002707 A1 | 1/2002 | Ekel et al. |
| 2002/0011951 A1 | 1/2002 | Pepin et al. |
| 2002/0054412 A1 | 5/2002 | Keller et al. |
| 2002/0059434 A1 | 5/2002 | Karaoguz et al. |
| 2002/0077992 A1 | 6/2002 | Tobin |
| 2002/0078161 A1 | 6/2002 | Cheng |
| 2002/0087300 A1 | 7/2002 | Patwari |
| 2002/0091785 A1 | 7/2002 | Ohlenbusch et al. |
| 2002/0109665 A1 | 8/2002 | Matthews et al. |
| 2002/0128872 A1 | 9/2002 | Giammattei |
| 2002/0156677 A1 | 10/2002 | Peters et al. |
| 2002/0169000 A1 | 11/2002 | King |
| 2002/0174025 A1 | 11/2002 | Hind et al. |
| 2002/0186676 A1 | 12/2002 | Milley et al. |
| 2002/0199008 A1 | 12/2002 | Pecen et al. |
| 2003/0001882 A1 | 1/2003 | Macer et al. |
| 2003/0004678 A1 | 1/2003 | Zhang et al. |
| 2003/0013483 A1 | 1/2003 | Ausems et al. |
| 2003/0018581 A1 | 1/2003 | Bratton et al. |
| 2003/0028609 A1 | 2/2003 | Cahill |
| 2003/0054794 A1 | 3/2003 | Zhang |
| 2003/0103088 A1 | 6/2003 | Dresti et al. |
| 2003/0131715 A1 | 7/2003 | Georges |

* cited by examiner

METHOD AND DEVICE FOR COMMUNICATING DATA

CROSS-REFERENCE TO RELATED APPLICATION

This application is a continuation application of 10/025,088 filed on Dec. 18, 2001 now U.S. Pat. No. 7,831,278, issuing on Nov. 9, 2010, and claims the priority thereof.

FIELD OF THE INVENTION

The present invention relates generally to the communication of data and, more specifically, to the communication of data between a remote device and a portable device.

BACKGROUND

A current trend in the communications industry is to equip portable electronic devices with a wireless communication interface to communicate in an automated fashion with other devices within its communication range. Typically, technologies such as Bluetooth IEEE 802.15, IEEE 802.11a, IEEE 802.11b, or the like are used and these technologies are fast becoming industry standards. To facilitate universal communication between these devices, universal communication network connectivity arrangements have been developed such as Universal Plug and Play (UPnP). UPnP provides an industry standard architecture for pervasive peer-to-peer network connectivity of electronic devices to allow seamless proximity networking. Data may thus be communicated or exchanged between different devices in an uncontrolled and automated fashion.

BRIEF DESCRIPTION OF THE DRAWINGS

A better understanding of the present invention can be obtained from the following detailed description in conjunction with the following drawings, wherein.

DETAILED DESCRIPTION

Figure 1:
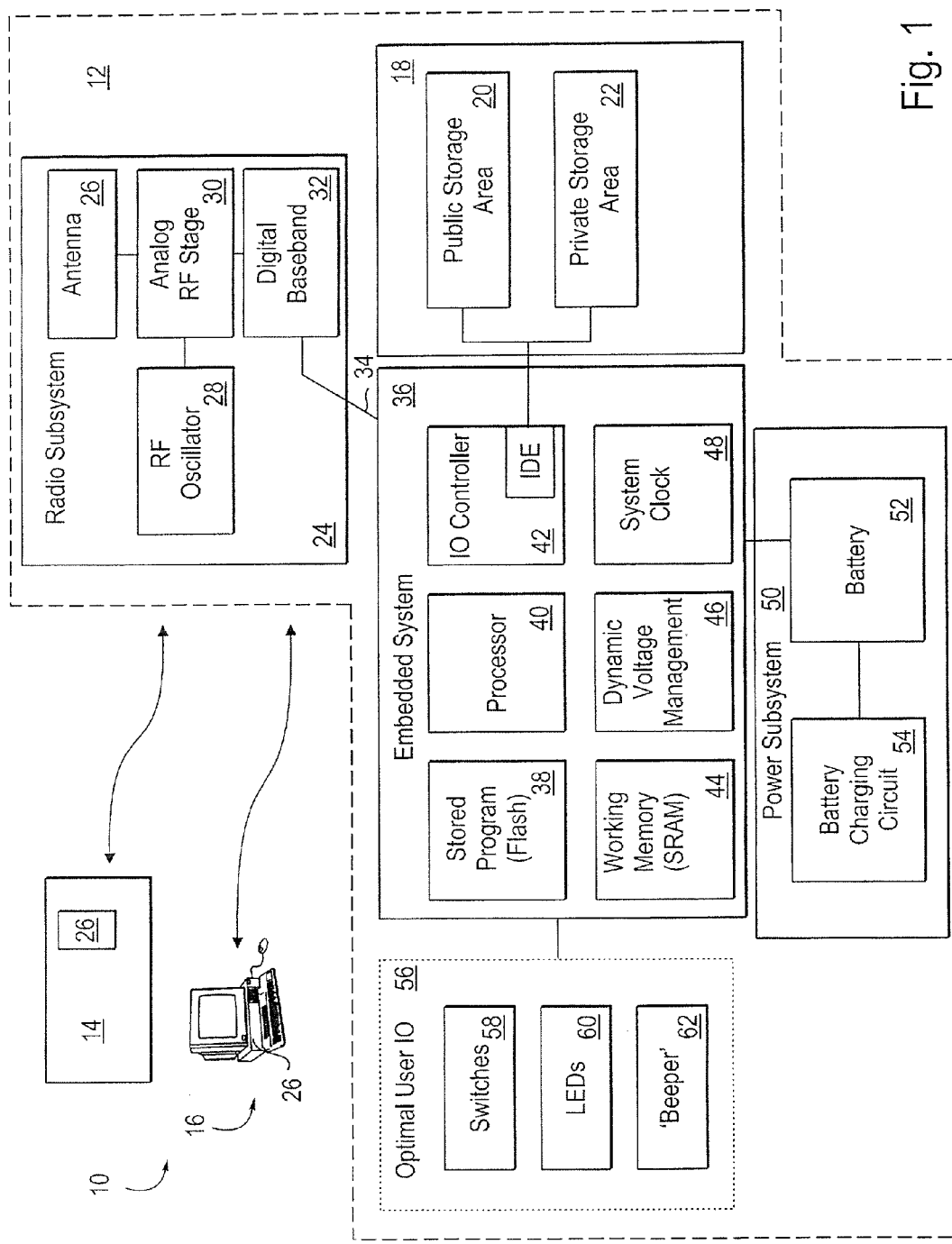
FIG. 1 shows a schematic block diagram of a communication system in accordance with one embodiment of the invention.

Referring to the drawings, reference numeral 10 generally indicates an embodiment of a data communication system in accordance with the invention. The system 10 includes a portable device 12 (also in accordance with the invention), a plurality of remote devices 14 (only one of which is shown in FIG. 1 of the drawings), and a computer system in the form of a personal computer (PC) 16. As described in more detail below, the portable device 12 includes a data storage module 18, which defines a first or public storage area 20, and a second or private storage area 22. In use, data is selectively exchanged in a locality between the remote devices 14 and the public and private storage areas 20, 22 respectively dependent upon access rights afforded by the portable device 12 to each particular remote device 14.

Each portable device 12 includes a wireless communication module 24 for communicating with a wireless communication interface 26 of each remote device 14 or the PC 16. The remote devices 14 typically broadcast information using Universal Plug and Play (UPnP) technology and the broadcasts may be accepted, rejected, or stored by the portable device 12. Likewise, requests by the remote device 14 to access data in the data storage module 18 may be accepted or rejected. Typically, a user carries a personalized portable device 12 on his or her person and, when in proximity to a remote device 14, data broadcast by the remote device 14 may be stored in the public or storage areas 20, 22 respectively in an automated fashion. Data or information in the portable device 12 may then be downloaded or read via the PC 16, also in a wireless fashion. The PC 16 may be used to personalize the portable device 12 to suit a user's needs and, thus, user specific data such as financial data, medical data, or the like may be stored in the private storage area 22. The manner of interaction between the portable device 12 and the remote device 14 may be dependent upon personal profile data associated with a bearer of the portable device 12 or based upon data obtained through interaction with local infrastructure.

The portable device 12 preferably includes a compact housing that is shaped and dimensioned so that it is suitable to be carried by a person in a convenient manner. The configuration of the housing may vary depending on how the portable device 12 is carried. For example, the housing may be configured so that the portable device 12 may be sewn into clothing, placed in a pocket, placed in a bag, or any other item accompanying a person. The wireless communications module 24 is typically a radio frequency (RF) transceiver including an antenna 26, an RF oscillator 28, an analog RF stage 30, and a digital baseband stage 32. The wireless communications module 24 is typically an industry standard communication module and, it is important to appreciate that, any standardized wireless communications protocol may be used to effect communication between the portable device 12 and the remote devices 14 or the PC 16. For example, in certain embodiments of the invention, IEEE 802.11a, IEEE 802.11b and IEEE 802.15 (as described below) technologies may be used.

In the embodiment depicted in the drawings, the wireless communications module 24 is typically a conventional Bluetooth IEEE 802.15 transceiver such as that available from Intel™ (e.g., an Intel Ambler module) and, accordingly, the wireless communications module 24 may be connected via a host control interface (HCI) bus 34 to a controller 36 which controls the storage and retrieval of data from the public and private storage areas 20, 22 respectively. The controller 36 is typically in the form of an embedded system including non-volatile memory 38 for storing its operating program, a processor 40, and 10 controller 42, working memory 44, a dynamic voltage management circuit 46, and a system clock 48. The portable device 12 also includes a rechargeable battery pack 50 including a rechargeable battery 52 and a battery charging circuit 54. The portable device 12 is thus configured so that it may be carried on the person, as mentioned above, and recharged when necessary. In certain embodiments, an optional user interface 56 is provided. The user interface 56 includes switches 58, visual indicators in the form of LEDs 60, and an audio generator in the form of a beeper 62. The user interface 56 communicates information on the portable device 12 to a user and, in certain embodiments, allows a user to store and/or retrieve data from the portable device 12 on a display device (e.g., a personal digital assistant (PDA), cellular telephone, PC, or the like) in a menu driven fashion. For example, the switches 58 may be in the form of thumbwheel switches allowing a user to scroll a cursor on the display device.

Figure 2:
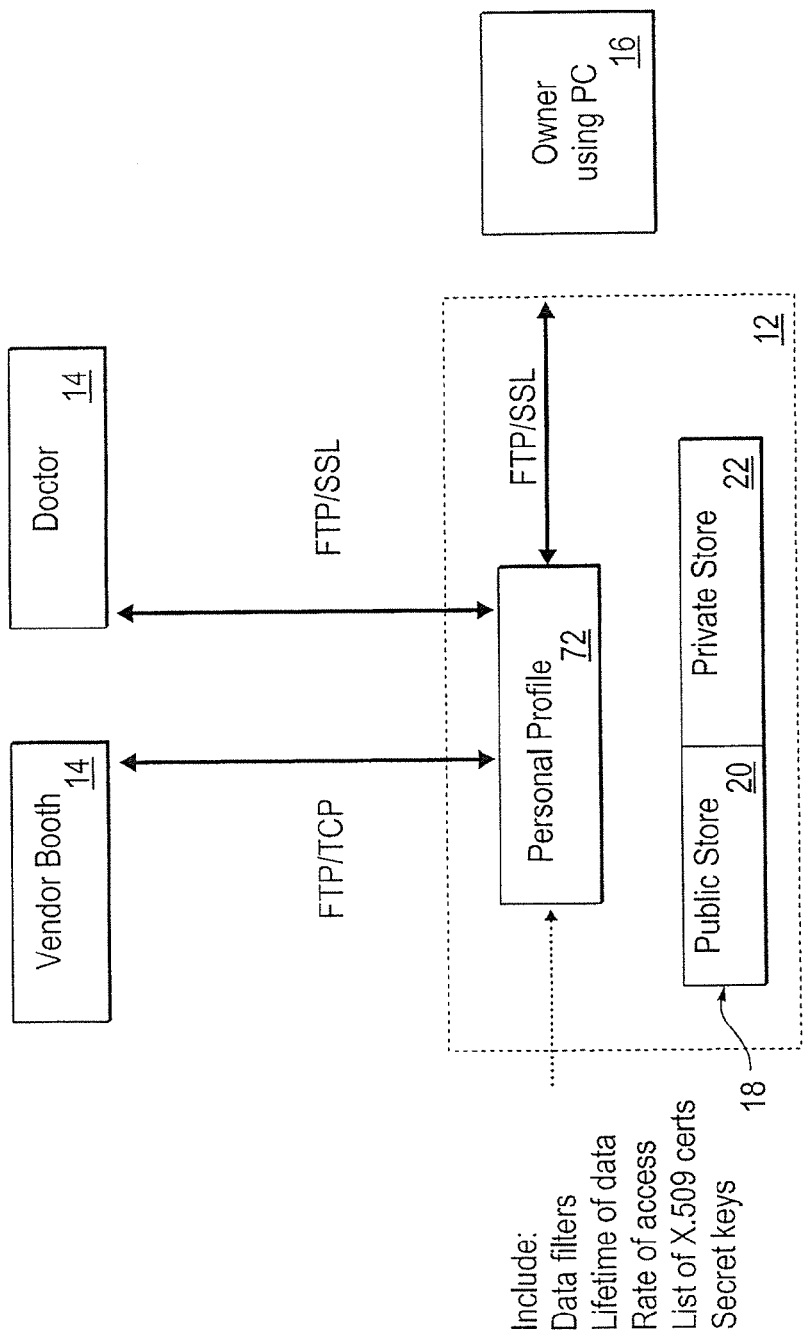
FIG. 2 shows a schematic block diagram of an alternative embodiment.

Referring in particular to FIG. 2 of the drawings, reference numeral 70 generally indicates a further embodiment of a data communication system in accordance with the invention. The system 70 substantially resembles the system 10 and, accordingly, like reference numerals have been used to indicate the same or similar features unless otherwise indicated. In the system 70, a personal profile 72 is defined by the controller 36. The personal profile 72 relates uniquely to the bearer of the portable device 12 and defines access rights, which the remote devices 14 have to the public and private storage areas 20, 22 respectively. In FIG. 2, an example is shown wherein the portable device 12 communicates with a remote device 14 at a particular locality such as a vendor booth (e.g., a booth at a trade show or the like which broadcasts data relating to products and/or services), and a remote device 14 at a different locality such as a doctor's office (wherein confidential medical information may be exchanged). The remote devices 14 need not be stand-alone portable devices such as the portable device 12, but may be of a permanent or fixed nature e.g., a remote device permanently provided in a doctor's consulting rooms, at a vendor booth at a trade show or the like. However, it is to be appreciated that the remote device 14 may be another portable device 12 or be defined by a device substantially similar to the portable device 12. When the portable device 12 communicates with the remote device 14 at a vendor booth, the communication between the two devices may be by way of standard FTP/TCP (File Transfer Protocol/Transmission Control Protocol) communication protocols with a relatively low degree of communication security. Typically, remote devices, such as the remote device 14 at the vendor booth, are classified so that they may only gain access to the public storage area 20. However, more secure communication protocols using FTP/SSL (Secure Sockets Layer) are typically established between the remote device 14 at the doctors consulting rooms and the portable device 12 carried by a person visiting the doctor. Likewise, FTP/SSL communication protocols are typically used in order to retrieve data from the portable device 12 and personalize the portable device 12 using the PC 16.

Figure 3:
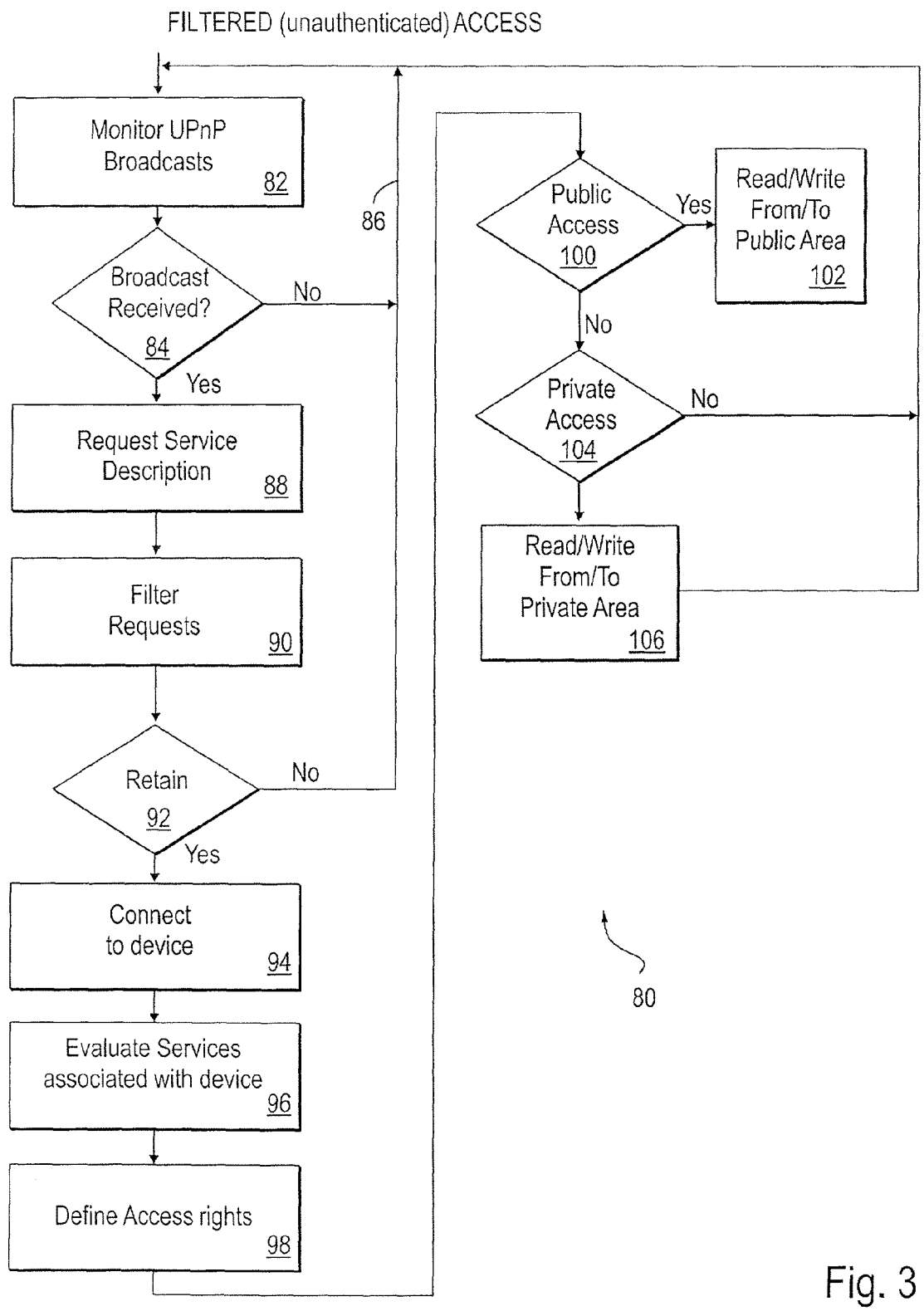
FIG. 3 shows a schematic flow diagram of a method used in the embodiments of FIGS. 1 and 2.

Referring in particular to FIG. 3 of the drawings, reference numeral 80 generally indicates a method, also in accordance with the invention, for communicating data between the remote device 14 and the portable device 12. The method 80 is implemented in the form of a computer program product which is coded in software stored in the memory 38 of the controller 36. The portable device 12, via its wireless communications module 24, constantly monitors its environment or locality for UPnP broadcasts from remote devices 14 within its wireless communication range (see step 82). If no broadcasts are received, and as shown at step 84, the method reverts to step 82, as shown by line 86, and enters a wait cycle until a broadcast is received. If, however, a broadcast is received by the portable device 12, the controller 36 requests a service description (e.g., in a unicast fashion) from the remote device 14 (see step 88) which identifies the service offered to the portable device 12 by the remote device 14. The system 10 may classify the remote devices 14 into a number of different classes dependant upon the service that the particular remote device 14 offers. For example, each remote device 14 may broadcast information on the name of the service that is being offered and, typically, such information includes the URL (Uniform Resource Locator) of any web pages which describe the service. Dependent upon the classification of the remote device 14, and the services it offers, the portable device 12 determines access rights which the remote device may have to the public and private storage areas 20, 22 respectively. Example classifications include private requests (e.g., medical services, banking services, or the like) and public requests (e.g., vendor services, movie theaters, or the like)

Once the particular classification of the service offered by the particular remote device 14 is determined, the controller 36 then filters (see step 90) the request to determine which services offered, if any, are of interest to determine whether or not substantive communications should be established between the remote device 14 and the portable device 12. For example, private requests of medical services may be filtered to ensure that the request is related to the bearer's doctor, clinic, HMO, or the like. Public requests may be filtered by the user when looking for restaurants, book vendors, and requests relating to sport and religion may then be rejected. It is important to appreciate that the user may thus define any one or more filtering parameters to suit his or her requirements at any given time. Substantive communications typically involve the reading and/or writing of data in the public and private storage areas 20, 22 respectively of the storage module 18. A decision is then taken at step 92 whether or not substantive communications are to be established and, if the controller 36 rejects the broadcast, the process reverts to step 82 to monitor the environment for further broadcasts.

If, however, the controller 36 accepts the broadcast, a communication link beyond mere discovery protocols is then established between the remote device 14 and portable device 12 as shown at step 94. At this point in the process, it is important to appreciate that the remote device 14 does not have access to the data storage module 18 and the controller 36 merely decides whether or not communications should be established between the two devices 12 and 14. Once the communications link has been established, the portable device 12 may then connect with the remote device 14 and the controller 36 may then further evaluate the nature of the services or information offered by the particular remote device 14 as shown at step 96. Based on the classification on the particular remote device 14, the controller 36 then defines the access rights that the remote device 14 has to the storage module 18 (see step 98). The access rights typically include reading and/or writing rights and may be defined using the PC 16.

The communications link between the portable device 12 and the remote device 14 typically exchanges data using FTP protocols or OpenOBEX protocols. In particular, once the access rights of the remote device 14 have been defined, the controller 36, as shown at step 100, determines whether or not the remote device 14 should be granted access rights to the public storage area 20 and, if so, the remote device 14 may then write data to, or read data from, the public storage area 20 as shown at step 102. The controller 36 typically limits how often and the amount of data that the remote device 14 is permitted to write to the public storage area 20 so that is does not command the entire or substantial part of the storage area 20. Further, the controller 36 periodically clears data from the public storage area 20 after the data has been resident in the area for a predetermined time duration. However, the data may be backed up or stored on a file server.

Examples, of the type of data which are written to the public storage area 20 include business card data which may be exchanged between participants in a business meeting each of which bear a portable device 12, product literature at a trade show where a vendor via his remote device 14 broadcasts product literature to visitor bearing a portable device 12, or the like. Likewise, a visitor to a trade show may communicate business or contact information to a vendor via his portable device 12. Typically, in these circumstances data is exchanged relatively freely (provided that the user has not decided to filter out data relating to the specific service or broadcast) between the public storage area 20 and the remote devices 14 within its wireless communication range. However, in other circumstances, as described in more detail below, data exchanged between the remote devices 14 and the private storage area 22 takes place in a more restricted manner. As shown at step 104, if the access rights of the remote device 14 include access to the private storage area 22, the remote device 14 may then write and/or retrieve data from the private storage area as shown at 106.

Figure 4:
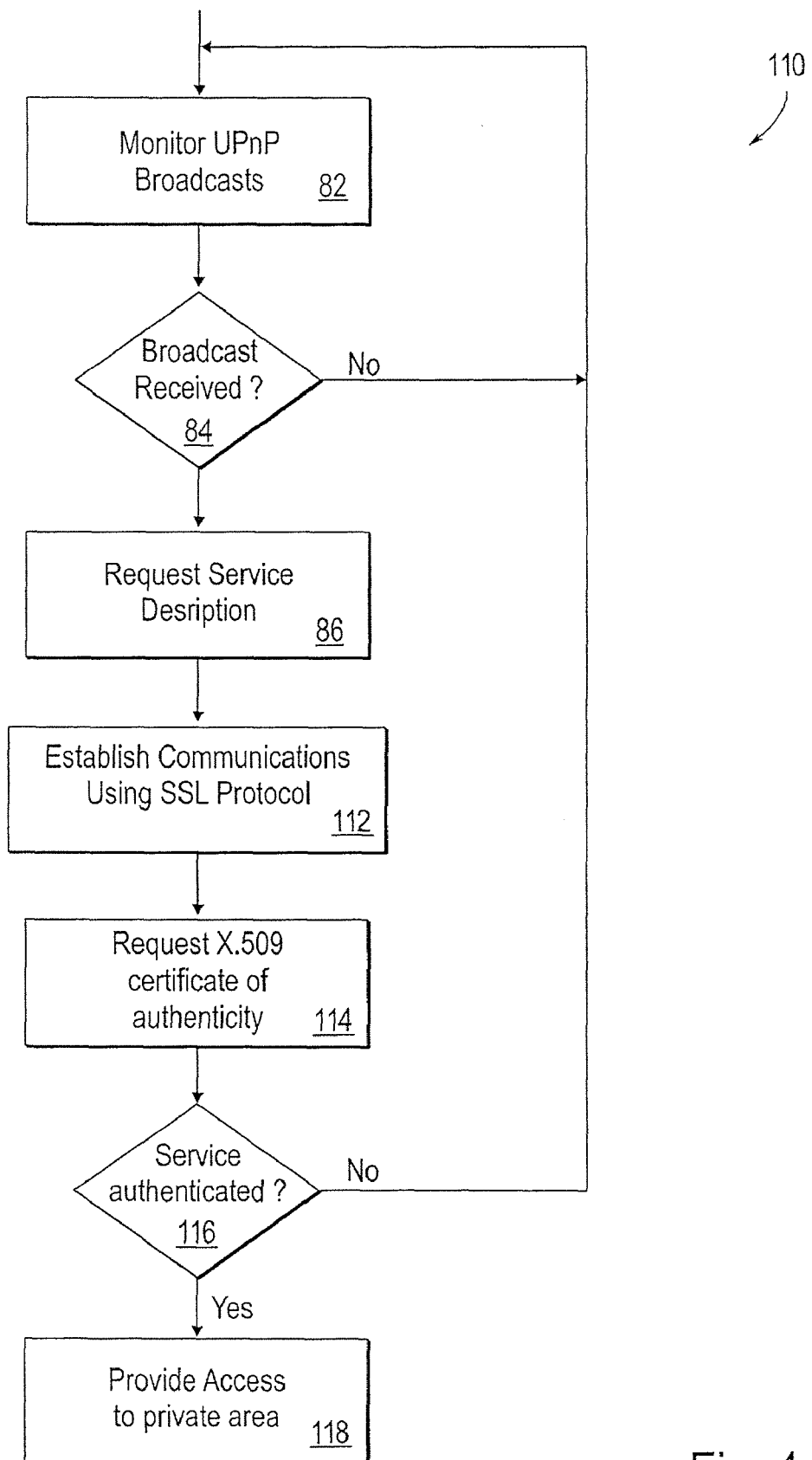
FIG. 4 shows a schematic flow diagram of further method steps used in the embodiments of FIGS. 1 and 2.

Referring in particular to FIG. 4 of the drawings, reference numeral 110 generally indicates further method steps which may be included in the method 80 to enhance security of the communication link between the remote device 14 and the portable device 12. These steps are typically executed when the portable device 12 requires connection only to remote devices 14 complying with a particular level of trust, e.g. communicating medical information to a family doctor to assist in prescribing medication. In circumstances of this nature, after the method steps 82 to 86 (see also FIG. 3) have been executed, the method 110 establishes communications with the remote device 14 using SSL protocols as shown at step 112. For example, an encryption key chosen by a Diffie-Hellman key exchange (using properties of an Rivest, Shamir, and Adelman (RSA) algorithm) may be used to establish a secret, but common, encryption key between the portable device 12 and the remote device 14. Once a secure communication link has been established, another algorithm, such as a triple-DES algorithm that is less computationally expensive, may be used. Thereafter, the portable device 12 requests a digital certificate of authenticity (e.g., an X.509 certificate of authenticity) from the remote device 14 as shown at step 114. If the service provided by the remote device 14 is authenticated (see step 116), the method 110 allows the remote device 14 to access the private storage area 22 as shown at step 118. As mentioned above, a typical example of a situation wherein secure communication is required is when the bearer of the portable device 12 visits a doctor's consulting room and personal and confidential information is required to be communicated between the portable device 12 and the remote device 14 of the doctor.

It is to be appreciated that the system 10 may include a variety of different remote devices, which communicate using a communication protocol compatible with the portable device 12. In addition, the portable device 12 may communicate with another portable device 12, each of which would then define a remote device 14 relative to the other portable device 12. Thus, in a business environment, selected data such as business card data may be exchanged by bearers of the portable device 12. Typically, in these circumstances, access is only allowed to the public storage area 20 of the portable device 12. Thus, when a particular device 12 is in wireless range of a remote device 14 (which may be defined by a portable device 12) data may be communicated between the two devices in an automated fashion. However, the level and nature of the access and exchange of information between each remote device 14 and the portable device 12 depends on the classification of the remote device 14. Dependent upon this classification and the associated access rights, the remote device 14 may access the private storage area 22 and/or the public storage area 20.

It is important to appreciate that, in order to enhance security, the public storage area 20 and the private storage area 22 may be defined by two physically separate memory devices. However, in other embodiments of the invention, a software partition may be provided between the public storage area 20 and the private storage area 22.

The embodiment depicted in the drawings has a first data storage area, which defines the public storage area 20, and a second data storage area, which defines the private storage area 22. However, it is also important to appreciate that any number of data storage areas may be defined. Each particular storage area may have its own access rights which, under control of the controller 36, would be accessible to a remote device 14 with the appropriate classification or access rights.

Thus, a method and device for communicating data have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A wireless device, comprising:
   a wireless communication module to communicate with each of a plurality of remote devices within a locality;
   a data storage module having a public storage area with which selected remote devices store and retrieve data in a free manner, and a private storage area with which selected remote devices store and retrieve data in a restricted manner; and
   a controller connected to the wireless communication module and to the data storage module, to filter requests from each of the remote devices to store and retrieve data, establish a wireless communication link between the wireless communication module and a remote device and grant access rights for the remote device to store and retrieve data at the public storage area and the private storage area based on a service request received from the remote device identifying services offered by the remote device to a user of the wireless device.

2. The wireless device of claim 1, wherein the controller defines access rights to the first and second storage areas and, dependent upon the access rights, allows the remote device to store and retrieve data from at least one of the first and second storage areas.

3. The wireless device of claim 1, wherein the controller restricts how often and the amount of data which is writable by the remote device into the public storage area.

4. The wireless device of claim 1, wherein data stored in the public storage area is selectively cleared by the controller in an automated fashion.

5. The wireless device of claim 1, wherein the portable device and the remote device communicate using secure sockets layer (SSL) protocols.

6. A portable device as claimed in claim 1, wherein the wireless communication module is a radio frequency (RF) transceiver.

7. A portable device as claimed in claim 6, wherein the standardized communication protocol is selected from the group including Bluetooth IEEE 802.15 technology, IEEE 802.11a technology, and IEEE 802.11b technology.

8. A data communication system, which includes:
   a plurality of remote devices, each remote device including a wireless communication interface; and
   wireless device including:
      a wireless communication module to communicate within a locality with the wireless communication interface the remote devices;
      a data storage module having a public storage area with which selected remote devices store and retrieve data in a free manner, and a private storage area with which selected remote devices store and retrieve data in a restricted manner; and a controller connected to the wireless communication module and to the data storage module, to filter requests from each of the remote devices to store and retrieve data, establish a wireless communication link between the wireless communication module and a remote device and grant access rights for the remote device to store and retrieve data at the public storage area and the private storage area based on a service request received from the remote device identifying services offered by the remote device to a user of the wireless device.

9. The system of claim 8, wherein the controller defines access rights to the first and second storage areas and, dependent upon the access rights, allows the remote device to store and retrieve data from at least one of the first and second storage areas.

10. A method comprising:
monitoring, by means of a portable device, wireless communications from a plurality of remote devices requesting communications with the portable device within a locality, the portable device including a public storage area with which selected remote devices store and retrieve data in a free manner, and a private storage area with which selected remote devices store and retrieve data in a restricted manner;
identifying access rights associated with the remote device; and
establishing a wireless communication link between the wireless communication module and a remote device based on a service request received from the remote device identifying services offered by the remote device to a user of the wireless device; and
granting access rights to the public storage area and the private storage area based on a classification of the remote device.

11. The method of claim 10, further comprising:
storing and retrieving data at the first storage area; and
storing and retrieving data at the second storage area.

12. The method of claim 11, wherein the first storage area defines a public data storage area and the second storage area defines a private data storage area.

13. The method of claim 11, further comprising:
defining access rights to the first and second storage areas; and
allowing the remote device to store and retrieve data from at least one of the first and second storage areas based upon the access rights.

14. The method of claim 13, wherein the access rights are dependent upon a classification of the remote device by the portable device.

15. A computer program product including a non-transitory machine readable including instructions which, when executed by the computer, cause the computer to:
monitor, by means of a portable device, wireless communications from a plurality of remote devices requesting communications with the portable device within a locality, the portable device including a public storage area with which selected remote devices store and retrieve data in a free manner, and a private storage area with which selected remote devices store and retrieve data in a restricted manner;
identify access rights associated with the remote device; and
establish a wireless communication link between the wireless communication module and a remote device based on a service request received from the remote device identifying services offered by the remote device to a user of the wireless device; and
grant access rights to the public storage area and the private storage area based on a classification of the remote device.

16. The computer program product of claim 15, further comprising:
storing and retrieving data at the first storage area; and
storing and retrieving data at the second storage area.

* * * * *